(12) United States Patent
Liu et al.

(10) Patent No.: US 11,900,953 B2
(45) Date of Patent: Feb. 13, 2024

(54) AUDIO PROCESSING DEVICE AND AUDIO PROCESSING METHOD

(71) Applicant: Realtek Semiconductor Corporation, Hsinchu (TW)

(72) Inventors: Chun-Chang Liu, Hsinchu (TW); Jing-Chu Chan, Hsinchu (TW); Hung-Yi Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 202 days.

(21) Appl. No.: 17/159,505

(22) Filed: Jan. 27, 2021

(65) Prior Publication Data

US 2021/0249024 A1 Aug. 12, 2021

(30) Foreign Application Priority Data

Feb. 6, 2020 (TW) .................... 109103754

(51) Int. Cl.
*G10L 19/02* (2013.01)
*G10L 19/26* (2013.01)
*H04L 65/80* (2022.01)
*H04J 3/06* (2006.01)

(52) U.S. Cl.
CPC .............. *G10L 19/02* (2013.01); *G10L 19/26* (2013.01); *H04J 3/0632* (2013.01); *H04L 65/80* (2013.01)

(58) Field of Classification Search
CPC ......... G10L 19/02; G10L 19/26; H04L 65/61; H04L 65/764; H04J 3/0632; G09G 5/006; G09G 2370/10

See application file for complete search history.

(56) References Cited

U.S. PATENT DOCUMENTS

| 5,500,874 A | * | 3/1996 | Terrell | H03H 17/0628 |
| | | | | 375/232 |
| 5,644,310 A | | 7/1997 | Laczko, Sr. et al. | |
| 6,816,543 B1 | * | 11/2004 | Shibuta | H04B 1/7077 |
| | | | | 375/150 |
| 8,258,846 B2 | | 9/2012 | Lin | |
| 2006/0009983 A1 | | 1/2006 | Magliaro et al. | |
| 2012/0056649 A1 | * | 3/2012 | Lin | H04L 7/005 |
| | | | | 327/113 |
| 2018/0212856 A1 | * | 7/2018 | Shigehisa | H04N 21/4305 |

FOREIGN PATENT DOCUMENTS

| CN | 104270218 A | 1/2015 |
| EP | 3010168 B1 | 10/2019 |
| JP | 2007295185 A | * 11/2007 |
| TW | I386002 B | 2/2013 |

OTHER PUBLICATIONS

Video Electronics Standards Association, "VESA DisplayPort Standard", Version 1, Revision 1a, Jan. 11, 2008, pp. 233.

* cited by examiner

*Primary Examiner* — Michelle M Koeth
*Assistant Examiner* — Paul J. Mueller
(74) *Attorney, Agent, or Firm* — Locke Lord LLP; Tim Tingkang Xia, Esq.

(57) ABSTRACT

An audio processing method includes the following operations. A calculated value is obtained according to multiple audio clock frequency information contained in multiple audio input packets. An audio sampling frequency is generated according to the calculated value and a link symbol clock signal. Multiple audio output packets corresponding to the audio input packets are generated according to the audio sampling frequency.

11 Claims, 4 Drawing Sheets

AUDIO PROCESSING DEVICE AND AUDIO PROCESSING METHOD

CROSS-REFERENCE TO RELATED APPLICATION

This application claims priority to Taiwan Application Serial Number 109103754, filed Feb. 6, 2020, which is herein incorporated by reference in its entirety.

BACKGROUND

Technical Field

The present disclosure relates to an audio processing device and an audio processing method, and more particularly, to an audio processing device and an audio processing method for improving sampling frequency.

Description of Related Art

With the development of technology, electronic devices with audio playback functions have been widely used in people's daily lives, such as various types of audio-visual appliances. When digital audio data are transmitted, they do not contain or retain the sampling frequency of the original audio. Therefore, the sink device must perform audio clock regeneration to reconstruct the audio sampling frequency.

However, in order to obtain accurate audio sampling frequency, the waiting time before playing the audio is increased. If the hardware circuit is used to compensate and correct the audio sampling frequency, the design cost is also increased. Therefore, how to improve the aforementioned problem of audio sampling frequency is an important issue in the field.

SUMMARY

One aspect of the present disclosure is related to an audio processing device including a data processor, a clock generator, and a buffer memory. The data processor is configured to obtain a calculated value according to a plurality of audio clock frequency information comprised in a plurality of audio input packets. The clock generator is configured to generate an audio sampling frequency according to the calculated value and a link symbol clock signal. The buffer memory is configured to generate a plurality of audio output packets corresponding to the audio input packets according to the audio sampling frequency.

Another aspect of the present disclosure is related to an audio processing method including the following operations. A calculated value is obtained according to multiple audio clock frequency information contained in multiple audio input packets. An audio sampling frequency is generated according to the calculated value and a link symbol clock signal. Multiple audio output packets corresponding to the audio input packets are generated according to the audio sampling frequency.

DETAILED DESCRIPTION

Figure 1:
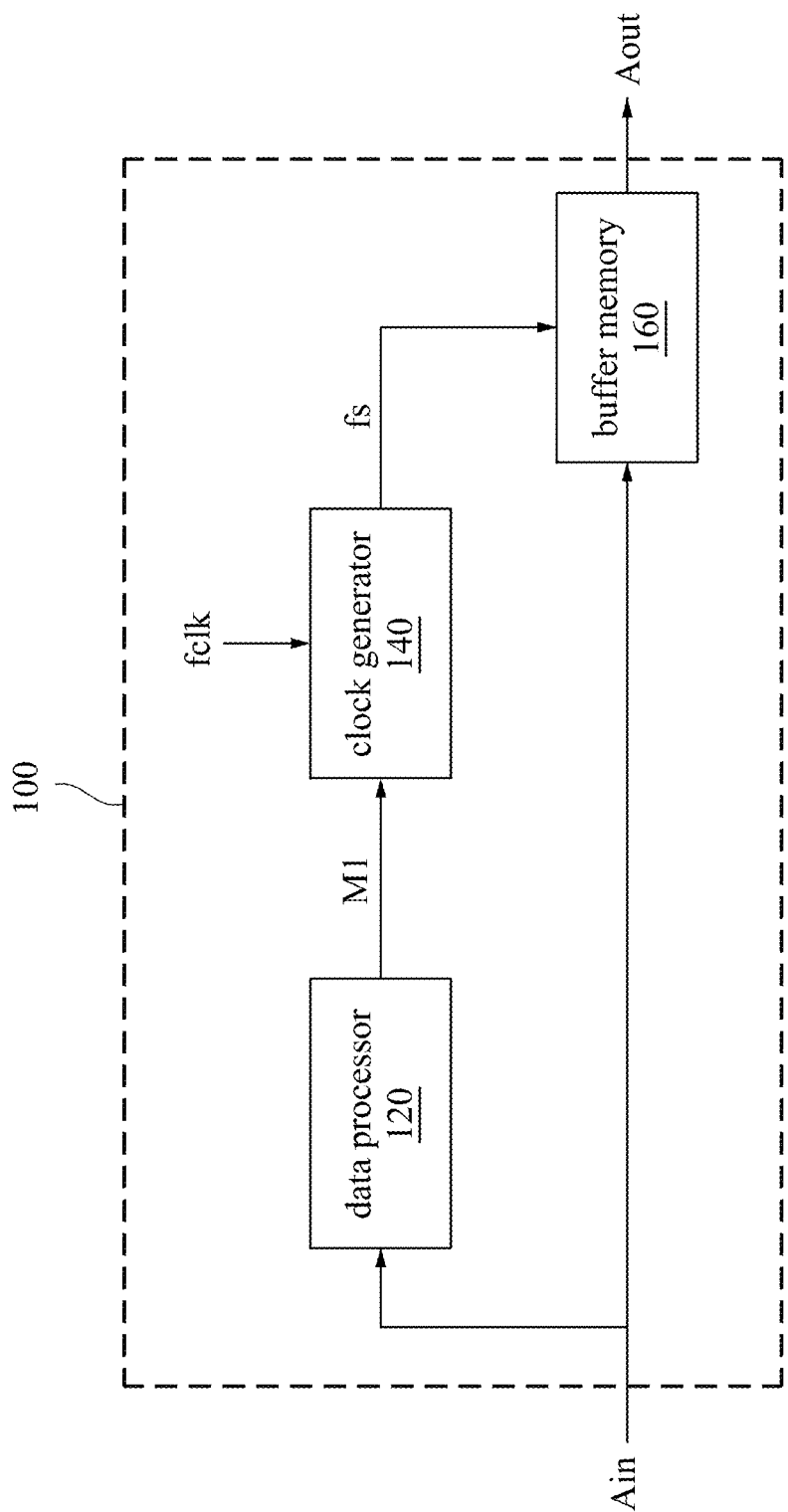
FIG. 1 is a schematic diagram of an audio processing device according to an embodiment of the present disclosure.

Reference will now be made in detail to the present embodiments of the disclosure, examples of which are illustrated in the accompanying drawings, but the specific described embodiments are only used to explain the disclosure rather than limit the disclosure. The description of the structural operations is not used to limit the order of execution. Any structure recombined by components to produce devices with equal effects is within the scope of the present disclosure.

When digital audio data is transmitted through various audio transmission lines, such as DisplayPort (DP), high definition multimedia interface (HDMI), and universal serial bus (USB), digital audio data does not contain or retain the sampling frequency of the original audio. Therefore, the sink device must perform audio clock regeneration to reconstruct the audio sampling frequency.

For convenience of explanation, the DisplayPort standard is taken as an example in the present disclosure, but it is not limited thereto. Those skilled in the art can apply it to other audio transmission standards to quickly obtain accurate audio sampling frequency. In the DisplayPort standard, the information about the audio sampling frequency is provided by the following formula (1) with the audio clock frequency information in the audio timestamp packet.

$$Maud/Naud = 512 \times fs/fclk \quad (1)$$

Maud and Naud are audio clock frequency information, fclk is a link symbol clock signal, and fs is the sampling frequency of the audio stream being transmitted.

In general, the audio clock frequency information Maud (M value for audio) and Naud (N value for audio) can be used to set an initial frequency of an audio clock recovery circuit, and the exact adjustment of the frequency is performed according to the temporary storage amount of the audio data in the first-in-first-out (FIFO) memory. Therefore, if it is desired to obtain accurate audio sampling frequency, it is necessary to wait for the frequency compensation adjustment, which results in the increasement of waiting time before playing the audio. Moreover, since the frequency compensation adjustment is often performed by a hardware circuit, the design cost is increased.

In further explanation, since the minimum precision unit of the first-in-first-out memory is one audio packet, the frequency error is not enough to change until the size of one audio packet is accumulated. It is assumed that the actual audio sampling frequency is 32 kHz and the object of the frequency error is within 10 ppm (parts per million), it means that 32,000 audio packets can be received in 1 second and there is only one audio packet error in 100,000 audio packets. Therefore, it is necessary to wait at least 3.125 seconds to accumulate enough 100,000 audio packets to distinguish the sampling precision of 10 ppm according to the following formula (2).

$$10 \text{ ppm} = 10 \times 10^{-6} = 10^{-5} = \frac{1}{100000} = \frac{1}{3.125 \times 32000} \quad (2)$$

In other words, even the initial value completely conforms to the actual value, the confirmation still takes 3.125 seconds to obtain the audio sampling frequency according to the variation of the temporary storage amount of the data in the first-in-first-out memory. That is, when the initial value does not conform to the actual value and the initial value correction need to be performed, the waiting time before playing the audio is certainly longer. In addition, if the audio sampling frequency changes during playing the audio, for example, from 192 kHz down to 48 kHz or from 48 kHz up to 192 kHz, it needs to use a lookup table and perform the adjustment through the frequency division or frequency multiplication to regenerate a new sampling frequency.

In order to solve the aforementioned problems, the present disclosure proposes an audio processing device and an audio processing method. First, the following formula (3) can be derived from the formula (1).

$$fs = \frac{1}{512} \times \frac{Maud}{Naud} \times fclk \quad (3)$$

Naud is a fixed value, and Maud and fclk are variables. Although the link symbol clock signal fclk is affected by spread spectrum, the effect of spread spectrum can be eliminated as long as the input clock of a clock generator is referred to the frequency of the link symbol clock signal fclk. Therefore, according to the formula (3), as long as the accurate Maud can be calculated, the accurate audio sampling frequency fs can be obtained.

In other words, in the present disclosure, the accurate Maud is obtained through the audio processing method, and the accurate audio sampling frequency fs is generated by a clock generator of the audio processing device, such that the waiting time before playing the audio can be shorten. The audio processing device and audio processing method are described in the subsequent paragraphs.

Reference is made to FIG. 1. FIG. 1 is a schematic diagram of an audio processing device 100 according to an embodiment of the present disclosure. As shown in FIG. 1, the audio processing device 100 includes a data processor 120, a clock generator 140 and a buffer memory 160. In structure, the data processor 120 is coupled to the clock generator 140. The clock generator 140 is coupled to the buffer memory 160.

In operation, the data processor 120 is configured to receive audio input packets Ain, and obtain a calculated value M1 by performing the audio processing method according to an audio clock frequency information included in the audio input packets Ain, and then output the calculated value M1 to the clock generator 140. In some embodiments, the data processor 120 is a digital filter or a circuit or a component capable of extracting and calculating the audio data. In some embodiments, the audio input packet Ain is the audio timestamp packet, or other transmission packet including the audio clock frequency information Maud and Naud.

The clock generator 140 is configured to receive the calculated value M1 and the link symbol clock signal fclk to generate the audio sampling frequency fs, and output the audio sampling frequency fs to the buffer memory 160. In some embodiments, the clock generator 140 can be implemented by phase-locked loops (PLL) or direct digital synthesis (DDS) device, but the present disclosure is not limited thereto. For example, the clock generator 140 uses feedback control so that the outputted audio sampling frequency fs and the received link symbol clock signal fclk have the ratio in the formula (3) as described above. In other words, when the frequency or phase of the link symbol clock signal fclk varies, the clock generator 140 may detect the variation and adjust the output signal via internal feedback mechanism, so that the audio sampling frequency fs and the link symbol clock signal fclk are kept synchronous.

The buffer memory 160 generates audio output packets Aout corresponding to the audio input packets Ain according to the audio sampling frequency fs, and is configured to stabilize the input and output of the audio packet. Specifically, when the clock generator 140 can quickly output the accurate audio sampling frequency fs, the buffer memory 160 can output the audio output packet Aout according to the received audio input packet Ain at accurately-recovered audio sampling frequency fs. In some embodiments, the buffer memory 160 can be implemented by a first-in-first-out (FIFO) memory, but the present disclosure is not limited thereto.

In some embodiments, the calculated value M1 is an arithmetic mean, a weighted mean, a geometric mean, a moving average, a median, or a mode, and the present disclosure is not limited thereto. For convenience of explanation, the following details about the data processor 120 are described by using the arithmetic mean as the calculated value M1.

Figure 2:
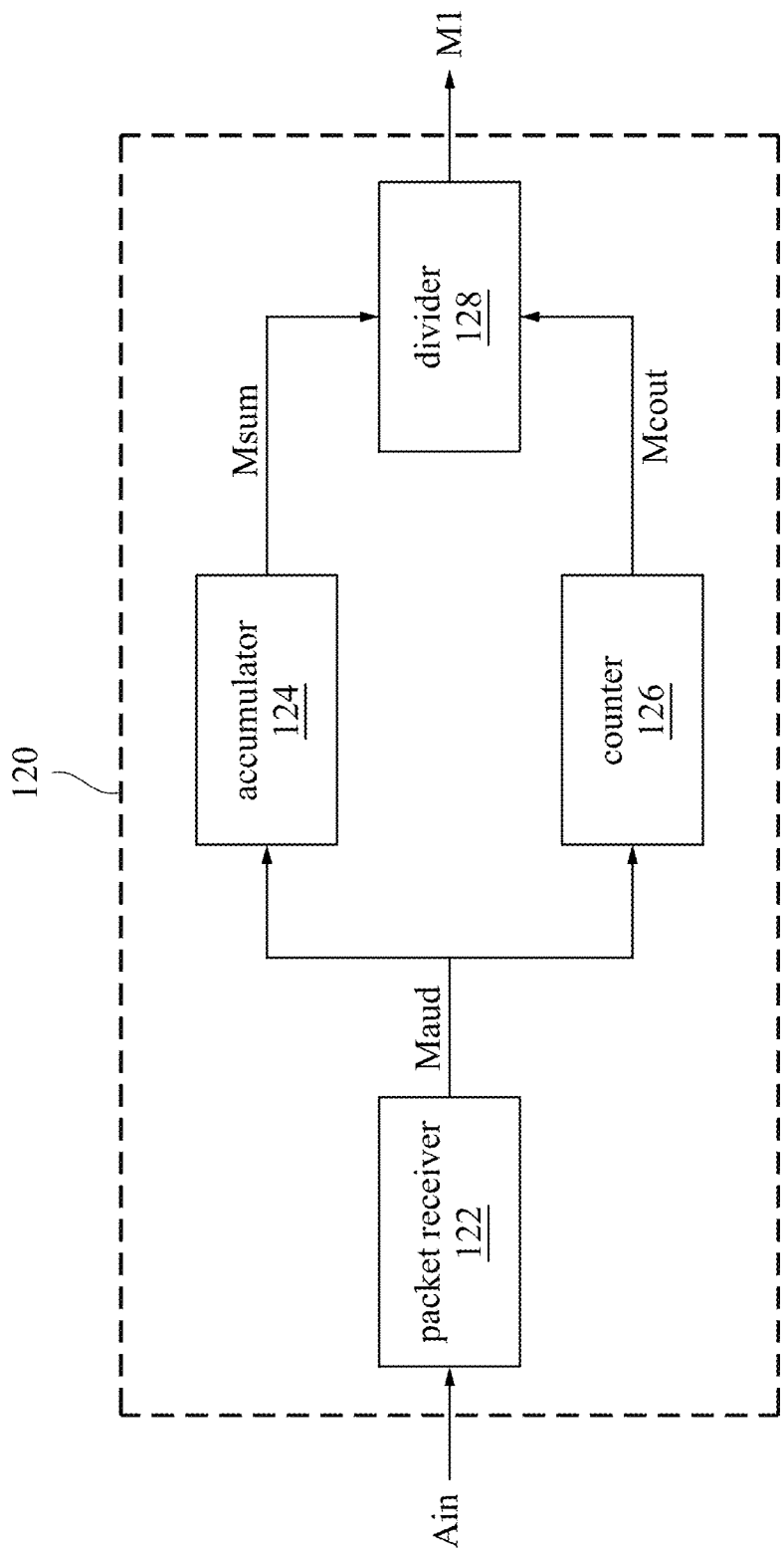
FIG. 2 is a schematic diagram of a data processor according to an embodiment of the present disclosure.

Reference is made to FIG. 2. FIG. 2 is a schematic diagram of a data processor 120 according to an embodiment of the present disclosure. As shown in FIG. 2, the data processor 120 includes a packet receiver 122, an accumulator 124, a counter 126, and a divider 128. In structure, the packet receiver 122 is coupled to the accumulator 124 and the counter 126. The divider 128 is also coupled to the accumulator 124 and the counter 126.

In operation, the packet receiver 122 is configured to receive a number of audio input packets Ain, and obtain a number of audio clock frequency information Maud from the audio input packets Ain to output them to the accumulator 124 and the counter 126. The accumulator 124 is configured to receive the audio clock frequency information Maud and add up them to generate a data sum value Msum. The counter 126 is configured to receive the audio clock frequency information Maud and calculate the amount thereof to generate a data number Mcout. The divider 128 is configured to receive the data sum value Msum from the accumulator 124 and the data number Mcout from the counter 126, and divide the data sum value Msum by the data number Mcout to generate the arithmetic mean as the calculated value M1.

It is noted that, although the data processor 120 in FIG. 2 is configured to calculate the arithmetic mean of all received audio clock frequency information Maud, the present disclosure is not limited thereto. In some other embodiments, the data processor 120 can perform other processing on the audio clock frequency information Maud according to the audio processing method, for example, filtering the audio clock frequency information Maud according to a predetermined condition. Further details are explained below.

Figure 3:
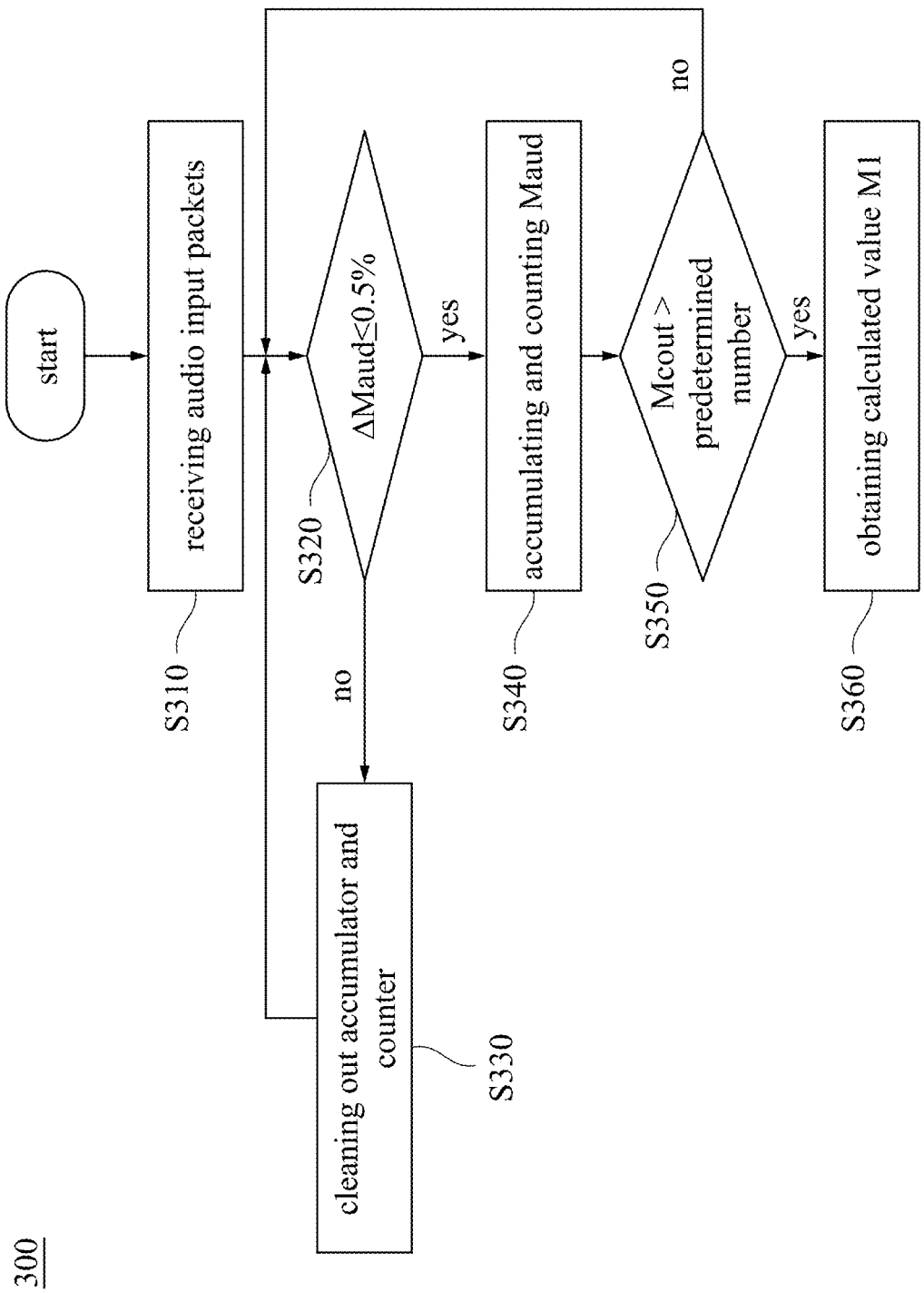
FIG. 3 is a flowchart of an audio processing method according to an embodiment of the present disclosure.

Reference is made to FIG. 3. FIG. 3 is a flowchart of an audio processing method 300 according to an embodiment of the present disclosure. For convenience and clarity of explanation, the following audio processing method 300 is described with the embodiments shown in FIG. 1 and FIG. 2, but it is not limited thereto. It will be apparent to those skilled in the art that various modifications and variations can be made without departing from the scope or spirit of the disclosure. As shown in FIG. 3, the audio processing method 300 includes operations S310, S320, S330, S340, S350, and S360.

First, in operation S310, the audio input packets Ain are received by the data processor 120. Specifically, the audio input packets Ain are received by the packet receiver 122 of the data processor 120, and the audio clock frequency information Maud contained in the audio input packets Ain is obtained from the audio input packets Ain.

Next, in operation S320, whether the variation range of the audio clock frequency information Maud exceeds a tolerance value is determined by the data processor 120. Specifically, according to the standard specification of the DisplayPort, if the variation range of the audio clock frequency information Maud exceeds the spread spectrum range of plus and minus 0.5%, it means that the present audio frequency is not yet stable. Therefore, when the variation range of the audio clock frequency information Maud exceeds the tolerable value, operation S330 is performed, and the accumulator 124 and the counter 126 are cleared out for recalculation by the data processor 120.

In this way, by determining whether the variation range of the audio clock frequency information Maud exceeds the tolerance value, whether the audio frequency is stable can be determined, and the invalid or unreasonable data can be avoided to affect the calculation result.

When the variation range of the audio clock frequency information Maud does not exceed the tolerance value (i.e., the audio frequency has been stabilized), operation S340 is performed, the audio clock frequency information Maud are accumulated and counted by the data processor 120. Specifically, the audio clock frequency information Maud is added up to generate the data sum value Msum by the accumulator 124 of the data processor 120, and the amount of the audio clock frequency information Maud is calculated to generate the data number Mcout by the counter 126 of the data processor 120. For example, the data processor 120 performs accumulation and count operations on the audio clock frequency information Maud according to a fixed number of receptions or a fixed reception period.

Next, in operation S350, whether the data number Mcout is greater than a predetermined number is determined by the data processor 120. Specifically, the predetermined number can be 100-2000. However, this value can be set according to actual needs, and the present disclosure is not limited thereto. In other embodiments, in operation S350, the determination is also made as to whether the accumulated time since it starts to receive the audio input packet Ain is greater than a predetermined period by the data processor 120. Specifically, the predetermined period may be 5 to 30 milliseconds. However, this value can be set according to actual needs, and the present disclosure is not limited thereto.

When the data number Mcout is not greater than the predetermined number (or the accumulated time is not greater than the predetermined period), operation S320 is performed again. When the data number Mcout is greater than the predetermined number (or the accumulated time is greater than the predetermined period), operation S360 is performed, and the calculated value M1 is obtained according to the audio clock frequency information Maud by the data processor 120. Specifically, in some embodiments, the data sum value Msum is divided by the data number Mcout to generate the calculated value M1 by the divider 128 of the data processor 120.

It is noted that, in some embodiments, operation S320 can be omitted in the audio processing method 300, that is, all received audio clock frequency information Maud are used for calculation. In some embodiments, the audio processing method 300 further includes other operations for filtering the audio clock frequency information Maud to ensure that the adopted audio clock frequency information Maud is valid.

In other some embodiments, the data processor 120 can also be configured to perform other calculations, such as weighted mean, geometric mean, moving average, median, or mode, on the audio clock frequency information Maud. Those skilled in the art can design the applicable data processor 120 according to actual needs, and the further description is not provided herein.

In this way, through the audio processing method 300, the data processor 120 performs arithmetic processing on the multiple received audio clock frequency information Maud to quickly obtain the calculated value M1 as accurate audio clock frequency information, so that the clock generator 140 can generate accurate audio sampling frequency fs according to the accurate audio clock frequency information. Since the precision of the audio sampling frequency generated by the clock generator 140 is extremely high, the speed at which the audio input packet enters the buffer memory 160 is almost the same as the speed at which the audio output packet outputs from the buffer memory 160, so that the cost time of frequency correction compensation can be saved. Moreover, compared with the manner of using feedback compensation mechanism by the integrated circuit or hardware to correct the frequency to be consistent with actual audio frequency, the present disclosure saves the hardware circuit components so that the design cost is reduced.

Figure 4:
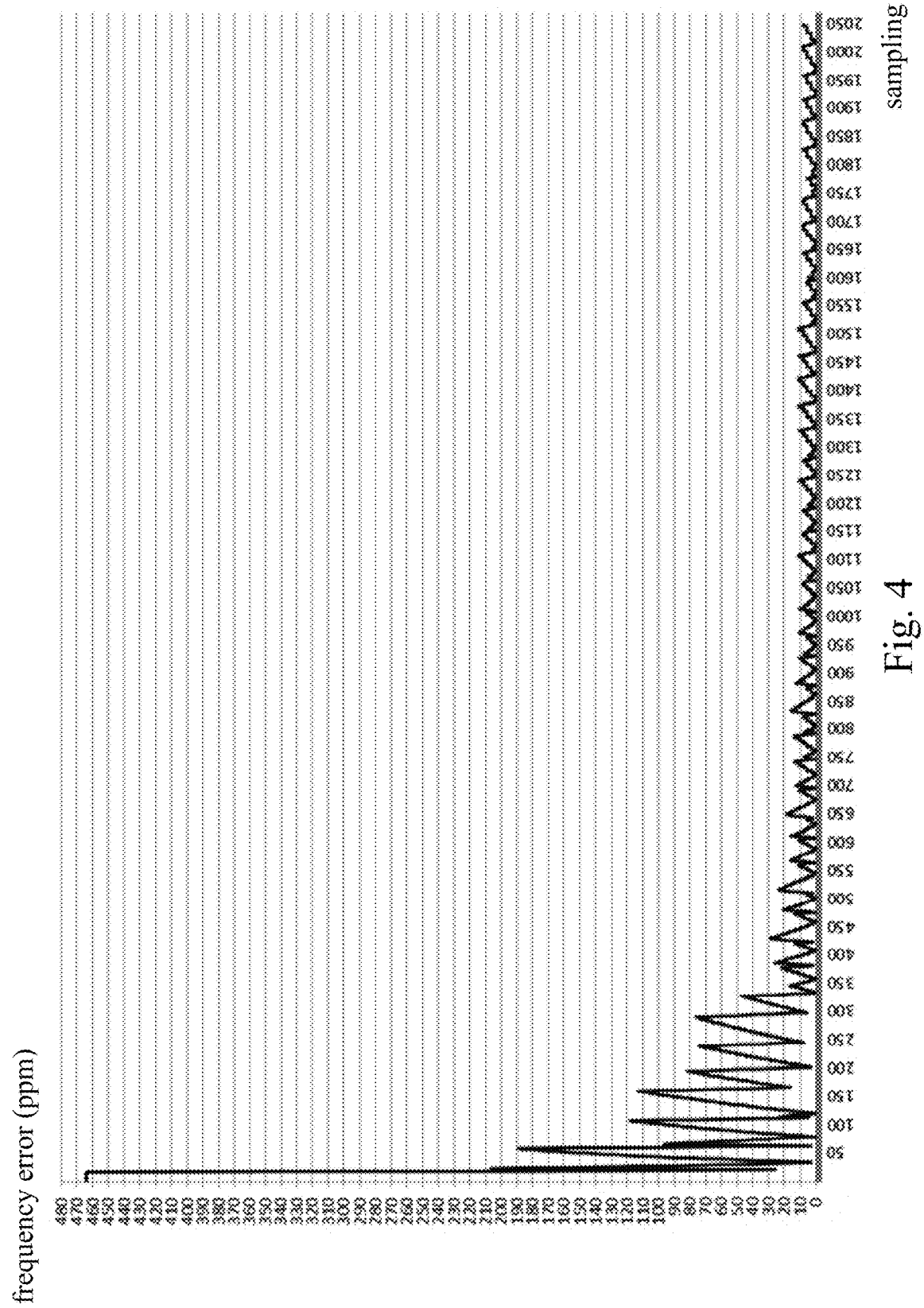
FIG. 4 is a graph of statistical result according to an embodiment of the present disclosure.

Reference is made to the following Table 1 and FIG. 4. The following Table 1 shows a relationship between the accumulated sampling number and the sampling frequency error according to an embodiment of the present disclosure. FIG. 4 is a graph of statistical result according to an embodiment of the present disclosure.

TABLE 1

| accumulated sampling number | accumulated sampling time (ms) | average value of Maud | audio sampling frequency based on average value of Maud (kHz) | frequency error of actual audio sampling frequency of 48 kHz (ppm) |
|---|---|---|---|---|
| 1 | 0.0148 | 05D400 | 48.0222702 | 463.96 |
| 50 | 0.7400 | 05D387 | 48.0070570 | 147.02 |
| 100 | 1.4800 | 05D372 | 48.0044167 | 92.02 |
| 150 | 2.2200 | 05D371 | 48.0042910 | 89.40 |
| 200 | 2.9600 | 05D35C | 48.0016507 | 34.39 |
| 250 | 3.7000 | 05D354 | 48.0006449 | 13.44 |
| 300 | 4.4400 | 05D353 | 48.0005192 | 10.82 |
| 350 | 5.1800 | 05D34A | 47.9993876 | 12.76 |
| 400 | 5.9200 | 05D34B | 47.9995133 | 10.14 |
| 450 | 6.6600 | 05D34B | 47.9995133 | 10.14 |
| 500 | 7.4000 | 05D34D | 47.9997648 | 4.90 |
| 550 | 8.1400 | 05D350 | 48.0001420 | 2.96 |
| 1000 | 14.8000 | 05D350 | 48.0001420 | 2.96 |
| 1100 | 16.2800 | 05D352 | 48.0003934 | 8.20 |
| 1200 | 17.7600 | 05D34D | 47.9997648 | 4.90 |
| 1300 | 19.2400 | 05D34F | 48.0000162 | 0.34 |
| 1400 | 20.7200 | 05D351 | 48.0002677 | 5.58 |
| 1500 | 22.2200 | 05D352 | 48.0003934 | 8.20 |
| 1600 | 23.6800 | 05D34E | 47.9998905 | 2.28 |
| 1700 | 25.1600 | 05D350 | 48.0001420 | 2.96 |
| 1800 | 26.6400 | 05D34F | 48.0000162 | 0.34 |
| 1900 | 28.1200 | 05D350 | 48.0001420 | 2.96 |
| 2000 | 29.6000 | 05D351 | 48.0002677 | 5.58 |

In general, the audio clock frequency information contained in the audio timestamp packet is 16-bits, and the average value of Maud calculated in the present disclosure is 24-bits, which is more accurate for analyzing the audio clock frequency information. According to Table 1, as the accumulated sampling number increases, the trend of the sampling frequency error decreases. According to FIG. 4, when the accumulated sampling number reaches about 550, the sampling frequency error can converge to less than 20 ppm, and the processing time is about 8.14 milliseconds in the convergence process. When the accumulated sampling number reaches about 1500, the processing time is about 22.2 milliseconds, and the sampling frequency error can steadily converge to within 10 ppm. In other words, compared with the traditional audio frequency processing method, which takes at least 3 seconds to distinguish the frequency error of 10 ppm and requires multiple frequency correction procedures to obtain the frequency accuracy of 10 ppm, the present disclosure can greatly reduce the processing time of obtaining accurate audio clock frequency information.

In summary, by performing arithmetic processing on the multiple received audio clock frequency information Maud by the data processor 120 of the audio processing device 100 according to the audio processing method 300, it is able to quickly obtain accurate audio clock frequency information, so that the clock generator 140 can generate accurate audio sampling frequency fs according to accurate audio clock frequency information, which reduces the waiting time before playing the audio.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. Therefore, the spirit and scope of the appended claims should not be limited to the description of the embodiments contained herein.

What is claimed is:

1. An audio processing device, comprising:
a data processor configured to generate a calculated value according to a plurality of first audio clock frequency information comprised in a plurality of audio input packets, wherein the calculated value is an arithmetic mean value, a weighted mean value, a geometric mean value, a moving average value, a median value, or a mode value, and the data processor comprises a packet receiver configured to obtain the first audio clock frequency information from the audio input packets, an accumulator configured to add up the first audio clock frequency information to generate a data sum value, a counter configured to calculate the amount of the first audio clock frequency information to generate a data number, and a divider configured to divide the data sum value by the data number to generate the calculated value, wherein when a variation range of the first audio clock frequency information does not exceed a tolerance value and an accumulated time is greater than a predetermined period, the divider divides the data sum value by the data number to generate the calculated value;
a clock generator configured to calculate an audio sampling frequency by the calculated value, a second audio clock frequency information comprised in the plurality of audio input packets and a link symbol clock signal; and
a buffer memory configured to generate a plurality of audio output packets corresponding to the audio input packets according to the audio sampling frequency.

2. The audio processing device of claim 1, wherein the audio input packets are audio data transmitted through a DisplayPort, a high definition multimedia interface, or a universal serial bus.

3. The audio processing device of claim 1, wherein when the variation range of the first audio clock frequency information exceeds the tolerance value, the data processor is further configured to clear out the accumulator and the counter for recalculation.

4. The audio processing device of claim 1, wherein the clock generator is a phase-locked loop or a direct digital synthesis device.

5. The audio processing device of claim 1, wherein the buffer memory is a first-in-first-out memory.

6. An audio processing device, comprising:
a data processor configured to generate a calculated value according to a plurality of first audio clock frequency information comprised in a plurality of audio input packets, wherein the calculated value is an arithmetic mean value, a weighted mean value, a geometric mean value, a moving average value, a median value, or a mode value, and the data processor comprises a packet receiver configured to obtain the first audio clock frequency information from the audio input packets, an accumulator configured to add up the first audio clock frequency information to generate a data sum value, a counter configured to calculate the amount of the first audio clock frequency information to generate a data number, and a divider configured to divide the data sum value by the data number to generate the calculated value, wherein when a variation range of the first audio clock frequency information does not exceed a tolerance value and the data number is greater than a predetermined number, the divider divides the data sum value by the data number to generate the calculated value;
a clock generator configured to calculate an audio sampling frequency by the calculated value, a second audio clock frequency information comprised in the plurality of audio input packets and a link symbol clock signal; and
a buffer memory configured to generate a plurality of audio output packets corresponding to the audio input packets according to the audio sampling frequency.

7. An audio processing method, comprising:
generating a calculated value according to a plurality of first audio clock frequency information comprised in a plurality of audio input packets, wherein the calculated value is an arithmetic mean value, a weighted mean value, a geometric mean value, a moving average value, a median value, or a mode value, and the first audio clock frequency information are obtained from the audio input packets by a packet receiver of a data processor, wherein generating the calculated value comprises:
adding up the first audio clock frequency information to generate a data sum value by an accumulator of the data processor;
calculating the amount of the first audio clock frequency information to generate a data number by a counter of the data processor;
dividing the data sum value by the data number to generate the calculated value by a divider of the data processor; and
when a variation range of the first audio clock frequency information does not exceed a tolerance value and the data number is greater than a predetermined number, dividing the data sum value by the data number to generate the calculated value by the divider;

calculating an audio sampling frequency by the calculated value, a second audio clock frequency information comprised in the plurality of audio input packets and a link symbol clock signal; and generating a plurality of audio output packets corresponding to the audio input packets according to the audio sampling frequency.

8. The audio processing method of claim 7, wherein the audio input packets are audio data transmitted through a DisplayPort, a high definition multimedia interface, or a universal serial bus.

9. The audio processing method of claim 7, further comprising:

when the variation range of the first audio clock frequency information exceeds the tolerance value, clearing out the accumulator and the counter by the data processor for recalculation.

10. The audio processing method of claim 7, wherein the audio sampling frequency is generated by a clock generator, and the clock generator is a phase-locked loop or a direct digital synthesis device.

11. The audio processing method of claim 7, wherein the plurality of audio output packets are generated by a buffer memory, and the buffer memory is a first-in-first-out memory.

\* \* \* \* \*